United States Patent [19]

Lang

[11] Patent Number: 4,605,561
[45] Date of Patent: Aug. 12, 1986

[54] FONDANT AND FOOD BARS PRODUCED THEREFROM

[75] Inventor: Kevin W. Lang, Rivervale, N.J.

[73] Assignee: General Foods Corporation, White Plains, N.Y.

[21] Appl. No.: 723,596

[22] Filed: Apr. 15, 1985

[51] Int. Cl.$^4$ ............................................. A23G 3/00
[52] U.S. Cl. ..................................... 426/93; 426/103; 426/572; 426/659; 426/660; 426/810
[58] Field of Search ............... 426/572, 659, 810, 103, 426/93, 331, 660

[56] References Cited

U.S. PATENT DOCUMENTS

| | | | |
|---|---|---|---|
| 1,255,638 | 2/1918 | Reed | 426/810 |
| 2,538,202 | 1/1951 | Kimball | 426/810 |
| 3,882,253 | 5/1975 | Schafer et al. | 426/810 |
| 3,917,874 | 11/1975 | Sands | 426/572 |
| 3,934,053 | 1/1976 | Kitson | 426/659 |
| 4,049,832 | 9/1977 | Hayward et al. | 426/571 |
| 4,152,462 | 5/1979 | Hayward et al. | 426/571 |
| 4,451,488 | 5/1984 | Cook et al. | 426/810 |

*Primary Examiner*—Jeanette Hunter
*Attorney, Agent, or Firm*—Barbara T. D'Avanzo; Thomas R. Savoie; Daniel J. Donovan

[57] ABSTRACT

An intermediate moisture, polyhydric alcohol-free, cooked fondant to be used in the production of food bars. This cooked fondant can be used in the production of different types of food bars, by mixing the fondant with various dry ingredients, including dry grains, nuts, and fruits. The soft, chewy food bars are processed without the use of polyhydric alcohols, by adding free water and sucrose to the fondant prior to cooking. This added free water is available to migrate from the cooked fondant to the dry ingredients after the food bars are produced, and this results in a smaller amount of sugar crystallization and a soft, chewy bar.

9 Claims, No Drawings

FONDANT AND FOOD BARS PRODUCED THEREFROM

TECHNICAL FIELD

The present invention relates to a fondant which is used in the production of ready-to-eat food bars which are soft, chewy and glycerine-free.

BACKGROUND OF THE INVENTION

Food bars have been known and available for some time. They vary in composition, some having a marshmallow base and others, originally introduced as health food bars, are comprised of grain(s), nuts, dried fruit, sweeteners and other ingredients. In the latter, the dried ingredients are mixed with a binder, such as sugar syrup, shortening or fondant (which is sometimes a cooked syrup but is used herein to refer to a mixture prior to cooking), compressed into bars, and then cut to the desired length. Depending on the bars' composition, they may be mixed, formed, and/or baked prior to packaging and sale.

The addition of glycerine to food, as taught by Berg in U.S. Pat. No. 2,437,150, has resulted in better mold release and bonding strength of food bars. Glycerine and other polyhydric alcohols are known to also effect the shelf-life and texture of food bars. In U.S. Pat. No. 4,451,488, Cook et al. used polyhydric alcohols such as glycerine to increase the shelf life of food bars by decreasing the water activity ($A_w$) but at the same time retaining good flavor characteristics and improved soft texture.

In recent years, the shelf-life of food has been extended through the use of a new technology which utilizes the concept of an intermediate-moisture food product. As is known, high levels of moisture in food generally promote the microbiological spoiling and growth of organisms such as yeast, molds and bacteria. Stabilization of food products has traditionally been effected through the use of inherent properties of food, such as the naturally high acid content that occurs in tomato sauces and the like; sterilization of the food followed by hermetic sealing; drying the food to moisture levels less than 10%; or freezing the product. Each of these methods has known drawbacks.

The intermediate-moisture foods rely on the reduction of the availability of water in the food to prevent microbial growth and lengthen shelf life. Such availability of water in the food is commonly termed water activity ($A_w$). In general, a low $A_w$, less than 0.90, indicates the existence of an environment in which most bacteria will generally not grow.

The $A_w$ of the food, or the partial vapor pressure of the water at the temperature of the food, can be readily determined by placing the sample in a sealed container and, upon reaching equilibrium, determining the relative humidity in the head space.

U.S. Pat. No. 3,202,514 to Burgess et al., which discloses an intermediate-moisture pet food, was the first to demonstrate the principle of extending the shelf-life of a food by controlling or altering the $A_w$. Burgess et al. shows how the $A_w$ of a food product can be maintained at a low level by a high sugar content. U.S. Pat. No. 4,146,652 to Kahn et al. discloses the substitution of polyhydric alcohols such as glycerine and sorbitol for sucrose. U.S. Pat. No. 4,451,488 to Cook et al. incorporates this knowledge into the production of soft and chewy food bars.

SUMMARY OF THE INVENTION

It is an object of the present invention to provide a tasteful, ready-to-eat food bar, with good shelf-life and good texture.

It is a further object of this invention to provide a fondant which will act as a binder for the food bar.

It is a further object of this invention to provide a soft and chewy food bar that is free of polyhydric alcohols such as sorbitol and glycerine.

These and other objects and advantages of the subject invention are obtained in accordance with the present invention wherein there is provided a soft, chewy, ready-to-eat food bar that is free of polyhydric alcohols.

The binder system is prepared by first forming a fondant comprised of sucrose, corn syrup, fat and added water and thereafter cooking the fondant at specified and critical conditions. It is the addition of the sucrose and water in the present invention that makes the difference. Previously, food bars were formulated which had moisture levels of from 4 to 8% and water activities of from 0.20 to 0.55. This was so because granola, puffed grain, dried fruit pieces and like materials normally used in food bar products demonstrate very low water activities (e.g., below 0.25). Cooked syrups previously used as binders in food bars, often showed vapor pressures in the area of 0.40. After the bars were manufactured water migration occurred, usually within the first 24 to 48 hours after production, and the resulting equilibrium vapor pressure was approximately 0.35. The transfer of water from the cooked syrup to the dry ingredients of the bar resulted in hard and crunchy food bars due to crystallization of sugars, primarily dextrose, present in the corn syrup. This hard and crunchy texture was overcome in earlier bars by the addition of polyhydric alcohols such as glycerine and sorbitol to the cooked syrups in order to reduce the moisture migration from the fondant to the dry ingredients.

The presently disclosed food bars remain soft and chewy without the addition of polyhydric alcohols. According to this invention, the addition of water to the fondant and the cooking of the fondant to a temperature of about 230° F. results in a cooked fondant with a moisture content of about 10–15%. When this cooked fondant is mixed with the dry ingredients there is more free water available in the cooked fondant to migrate to the dry ingredients. This higher moisture content in the cooked fondant prior to mixing, will also result in a higher equilibrium $A_w$ after water migration occurs.

In addition, sucrose is used as a main sweetening ingredient in the fondant presented herein. As it is a good water binder, sucrose will hold its water. This will result in little or no crystallization of the sucrose since little water will migrate from it to the dry ingredients.

The corn syrup used in the present fondant consists primarily of dextrose. Dextrose is not as good a water binder as sucrose, and water will tend to migrate from the dextrose to the dry ingredients. However, because of the added water to the fondant, there is more free water for equilibrating the vapor pressure, and therefore, the amount of water that migrates from the dextrose is not as large as in previous food bars. The resulting amount of crystallization is so small as to not have a hardening effect on the food bars.

DETAILED DESCRIPTION OF THE INVENTION

The fondant of this invention can be used as a binder system for different types and flavors of food bars; the two main catagories being granola bars and dried fruit bars and the flavor ingredients typically being chocolate chip, peanut butter and cinnamon raisin.

The fondant is comprised of 15-20% sucrose, 10-35% corn syrup, 15-40% other sweeteners, 5-20% fat, 5-25% dextrin, and 8-15% added water. Excluded from the sucrose grouping and included in other sweeteners, is any form of treated sucrose, such as brown sugar. The corn syrup used herein is one which has a DE of from 42 to 75 and is comprised of from 70 to 81% solids. Preferably, a 62 DE corn syrup with 77% solids will be used. The dextrin should have a DE of from 20 to 42, and will preferably be a 36.5 DE dextrin.

The actual amounts used of the above-stated ingredients, except the added water, depends upon the quality of the product to be produced and the particular flavor of the food bar. This would be known by one skilled in the art. The particular flavor of the bar would also require the addition of specific flavorings. For example, for peanut butter bars, vanilla and peanut flavoring may also be included in the cooked fondant. The amount of added water varies slightly as a result of the variations in the total fondant makeup, but the preferred range of added water is 9-12%.

The fondant is prepared through a process consisting of two main steps. First, the dextrin and water are mixed together until the dextrin is fully hydrated. This hydrated dextrin-water mixture contains 40-50% dextrin and 50-60% water, and said mixture comprises 13-30% by weight of the fondant. After the remaining ingredients are mixed in a steam jacketed kettle, the dextrin-water mixture is added. At this point, the total amount of water present in the kettle, including the added water and any water or moisture present in the other ingredients, ranges from 17 to 23%, depending upon the type of bar being made.

Once the fondant is formed by the above-stated mixing, it is heated until it reaches a temperature of from 220° to 250° F. The premise behind the heating is for the fondant to reach a desired plateau on the heating curve for the particular fondant. Upon reaching this plateau, the sugar within the fondant then possesses the desired crystal structure. If the heated sugars in the fondant fail to obtain the proper crystal structure by inadequate heating, the final food bar product will not set. Conversely, if the fondant is heated to too high a temperature, the resultant product will be too hard; it will be similar to hard crack candy. The fondant compositions of this invention will typically reach the desired plateau at a temperature of from 227° F. to 234° F., and should remain at that temperature for not more than 4 minutes. At this point, the total moisture content of the fondant is 10-15%. After cooling, the particular flavorings are added; (i.e. peanut flavor and vanilla). An exception to this is the chocolate chips which are added much later to insure that they remain discrete pieces. (See Example 3). After mixing in the flavorings, the cooked fondant is cooled further, for example in a vertical, swept-surface heat exchanger, until it reaches a temperature between 100° F. and 125° F., at which point it is pumped into a holding tank for future use.

The dry ingredients, which would usually be selected from grains, crisp rice, nuts, dried fruit and combinations thereof, depending on the food bar being produced, are mixed together in a blender, and the cooked fondant is added to the dry blend, in an amount so that the fondant is from 35 to 40% of the total weight. After mixing, the resultant dough is ready to be shaped into bars.

The dough is made into a continuous sheet whose thickness can be adjusted. The dough is kept at approximately 110° F. until it is molded. The dough then continues through a cooling chamber before being slit. After the dough is slit into strips, it is then cut into bars of the desired length. After final cooling, to about 40° F., the bars are passed through a wrapping machine, where they are individually wrapped.

The following examples are merely illustrative of the present invention and are not intended as a limitation on the scope thereof.

EXAMPLE 1

The fondant used in the production of cinnamon raisin granola bars, and the bars themselves, were prepared by first combining 20.1 lbs of water with 16.9 lbs of Maltrin M-365 (a 36.5 DE dextrin manufactured by Grain Processing Corp., Muscatine, Iowa). While the Maltrin completely hydrated in the water, the remaining ingredients of the fondant were mixed together; 41.7 lbs sucrose, 31.1 lbs brown sugar, 25.2 lbs corn syrup (62 DE, 77% solids), 31.1 lbs butter, 10.3 lbs safflower oil, 3.5 lbs lecithin, 31.1 lbs honey, 10.3 lbs date paste and 1.0 lb ground cinnamon. All of the ingredients, including the hydrated maltrin, were then mixed together in a steam jacketed kettle where they were continually blended and cooked. When the temperature of the fondant reached 230° F., the fondant was cooked for an additional 60 seconds, and then cycled through a water cooled vertical swept surface heat exchanger until the fondant was 110°. It was then placed in a holding tank. The fondant composition is 18.6% granular sucrose, 13.8% brown sugar, 11.2% corn syrup (62 DE, 77% solids), 13.8% butter, 4.6% safflower oil, 1.5% lecithin, 13.8% honey, 4.6% date paste, 0.46% ground cinnamon, 7.5% Maltrin M-365 and 9.8% added water. The dry ingredients were then mixed, comprising 43.0 lbs crisp rice, 289.0 lbs dark granola and 46.0 lbs raisins. To this, 222 lbs of the fondant was added. After mixing thoroughly, the resultant dough was formed into sheets, cut into bars and individually wrapped. Each bar weighed 1 oz. The final product remained soft and chewy for a period of at least six months and had a moisture content of 9.2% and an $A_w$ of 0.44.

EXAMPLE 2

Following the procedure as outlined in Example 1, a fondant is prepared for use in the production of peanut butter granola bars. The fondant comprises 15.2% granulated sucrose, 6.5% brown sugar, 31.1% corn syrup (62 DE, 77% solids), 10.9% butter, 4.6% safflower oil, 6.5% honey, 6.4% Isosweet 100 (a high fructose 71% solids corn syrup available from A. E. Staley Manufacturing Co., Decatur, ILL.), 0.30% salt, 0.46% vanilla, 2.4% peanut flavor, 6.5% Maltrin M-365 and 9.2% added water. The fondant is cooked following the procedure outlined in Example 1 except, the vanilla and peanut flavoring are added at a later time. After the fondant is cooked, it is allowed to cool and the two flavoring ingredients are added when the fondant reaches 160° F. The dry ingredients comprise 51.0 lbs crisp rice, 300 lbs dark granola, 30.0 lbs peanut butter and 12.0 lbs peanuts, to which 210 lbs of cooked fondant are added. The food bars that are produced after processing and wrapping are soft and chewy for at least six months and have a moisture content of 9.2% and an $A_w$ of 0.49–0.50.

EXAMPLE 3

The fondant used in the production of chocolate chip granola bars comprises 17.8% granular sucrose, 16.0% brown sugar, 14.2% corn syrup 62 DE, 77% solids), 14.0% Isosweet 100, 8.1% cocoa butter, 8.0% honey, 0.96% salt, 1.0% vanilla, 0.2% chocolate flavor, 9.2% Maltrin M-365, and 10.5% added water. 236 lbs. of the fondant are added to the mixed dry ingredients comprising 261.0 lbs. dark granola and 35 lbs. crisp rice. The process of manufacture is the same as Example 2, except that the chocolate chips are added after the dough is formed into the sheet of desired thickness. They are added at that point so they remain as discrete pieces, and do not melt into the bar. The final products after wrapping are soft, chewy food bars that retain said characteristics for at least six months and that have a moisture content of 9.2 and an $A_w$ of 0.37–0.39.

Having thus described the invention, what is claimed is:

1. A polyhydric alcohol-free cooked fondant, which has a moisture content of 10–15%, useful in the production of food bars, produced by cooking, at from 227° to 234° F. for not more than 4 minutes, a mixture comprising:
   (a) 15–20% granulated sugar;
   (b) 10–35% of a 42–75 DE corn syrup containing from 70 to 81% solids;
   (c) 5–25% of a 20–42 DE dextrin;
   (d) 5–20% fat;
   (e) 15–40% other sweeteners; and
   (f) 8–15% added water.

2. A soft, chewy, polyhydric alcohol-free ready-to-eat food bar, comprising:
   (a) 30–45% of the fondant of claim 1;
   (b) 40–50% dry food particles; said food bar having a moisture content between 6 and 15% and a water activity ($A_w$) between 0.30 and 0.65.

3. The food bar of claim 2 containing dry food particles selected from the group consisting of dried fruits, granola, crisp rice.

4. The food bar of claim 2 wherein the dry food particles are comprised of granola and 10–15% chocolate chips.

5. The food bar of claim 2 wherein the dry food particles are comprised of granola and 5–15% peanut butter.

6. The food bar of claim 2 wherein the dry food particles are comprised of granola and 5–10% raisins.

7. The food bar of claim 2 wherein the dry food particles consist of dried fruit.

8. A process for producing a soft, chewy, polyhydric alcohol-free, ready-to-eat food bar comprising the steps of:
   (a) hydrating a 20–42 DE dextrin in water to form a mixture containing 40–50% dextrin and 50–60% water, where said mixture comprises 13–30% by weight of a fondant;
   (b) preparing a mixture comprising 15–20% granulated sugar, 10–35% of a 42–75 DE corn syrup containing 70–81% solids, 5–20% fat, and 15–40% other sweeteners, said percentages are by weight of the total fondant;
   (c) preparing the fondant by mixing together the mixture in step a with the mixture in steb b to form the fondant;
   (d) heating the fondant until it has a final moisture content of 10–15%;
   (e) cooling the fondant of step d;
   (f) mixing together dried food particles;
   (g) adding the fondant to the dry food particles and mixing until a uniform dough is formed; and
   (h) shaping and cutting the dough into food bars.

9. The process of claim 8 where said fondant and dry ingredients are in a ratio of from 0.4:1 to 0.75:1.

* * * * *